May 1, 1923.
F. W. TEVES
1,453,369
SPEED REGULATOR FOR AUTOMOBILES
Filed March 4, 1922    3 Sheets-Sheet 2
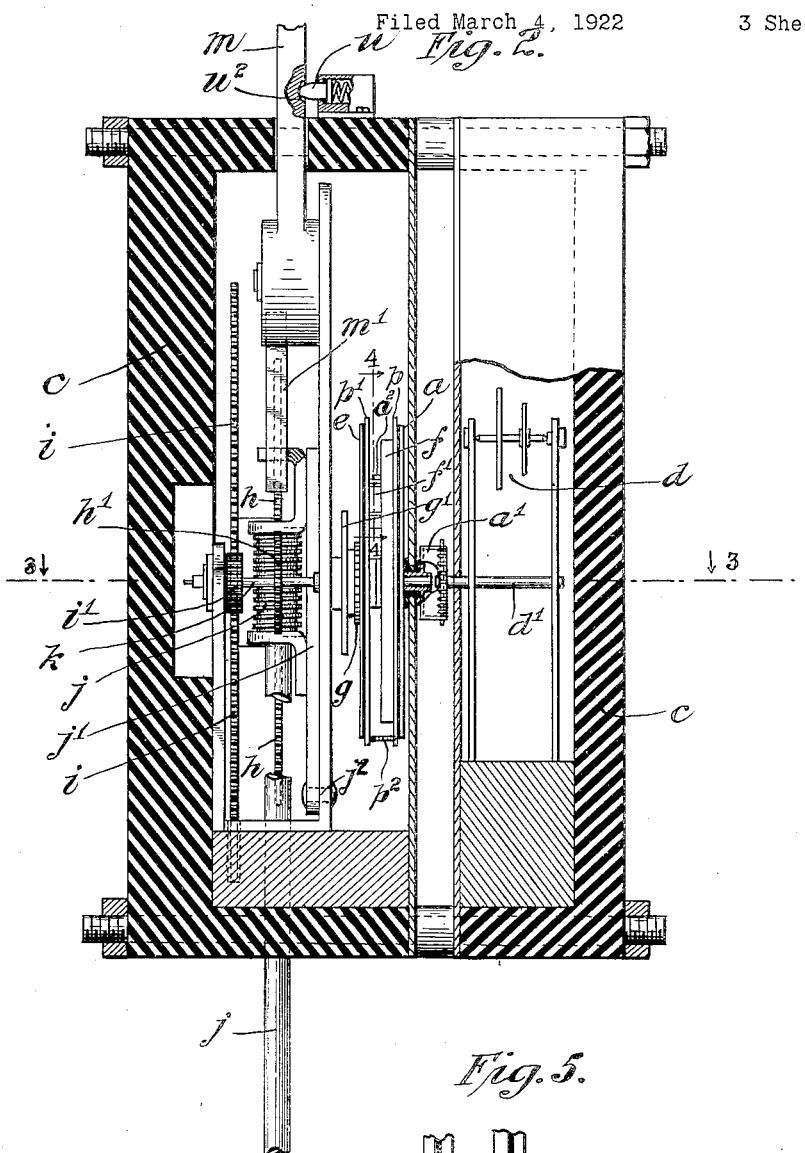
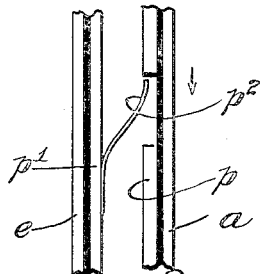

Patented May 1, 1923.

1,453,369

UNITED STATES PATENT OFFICE.

FREDERICK W. TEVES, OF EAST ELMHURST, NEW YORK, ASSIGNOR OF ONE-HALF TO ARTHUR HAZEN GREEN, OF NEW YORK, N. Y.

SPEED REGULATOR FOR AUTOMOBILES.

Application filed March 4, 1922. Serial No. 541,131.

*To all whom it may concern:*

Be it known that I, FREDERICK W. TEVES, a citizen of the United States, residing at East Elmhurst, in the borough of Queens, city of New York, county of Queens, and State of New York, have invented certain new and useful Improvements in Speed Regulators for Automobiles, of which the following is a specification, reference being had therein to the accompanying drawings, which form a part thereof.

My invention relates to speed regulators for automobiles, and more particularly to a type thereof adapted to interrupt the functioning of the ignition system of an engine for driving the automobile, in the event that the speed of the vehicle exceeds a predetermined number of miles per hour.

In my co-pending application, Serial No. 531,564, I have described an automatic regulator of the type above referred to employing two members, one of which is driven by a clockworks mechanism at uniform, constant speed, and the other of which is driven from the running gear of an automobile at a varying speed as determined by the speed of the vehicle, said variable speed member being adapted to be driven by the constant speed member so long as the vehicle is operating within the speed sanctioned by the regulator. Said members are provided with co-operating electrical contacts, the arrangement of which may be varied according to whether the regulator is to be used with an ignition system drawing its supply from a direct current battery, or a low tension magneto, both of which systems require a normally closed circuit, or with a high tension magneto which requires a normally open circuit.

The structure disclosed in my aforesaid application is such that a vehicle may be operated within the speed limit determined by the regulator, indefinitely, and may exceed this speed for a short distance, a suitable signalling device being provided to apprise the vehicle driver that he is exceeding the authorized speed so as to permit him to reduce the speed before the regulator becomes operative.

A regulator of the type described in my aforesaid application, as installed, is set for a fixed maximum speed of the vehicle, and its operative effect is incapable of variation, excepting that a slight interval is permitted by the normal functioning of the regulator during which the vehicle may exceed that speed. Such a regulator is suitable for use upon heavy vehicles having a low range of travel, since speed regulations within restricted areas provide for uniform maximum speeds. In long distant runs, and with light vehicles including pleasure vehicles, regulations sometimes permit a higher speed than with trucks or other heavy vehicles, and the speed limits in suburban and rural sections are usually higher than those permitted in urban districts.

With the above conditions in mind, I have provided a regulator having all of the essential characteristics of the regulator of my aforesaid application as to the control of the circuit to the ignition system, with the added characteristic that a setting mechanism is provided whereby the speed ratio of the variable speed member and of the driving gear of the vehicle may be changed at will, so that the regulator may be set for different maximum speeds. The setting mechanism is so constructed that under no circumstances can the variable speed member and the driving gear of the vehicle be disconnected, it being essential that said member and said gear be operatively connected at all times while the vehicle is moving since the operative effect of the regulator is governed by said variable speed member.

In addition to the provision of means by which the regulator may be set for different maximum speeds, I provide a signal device or semaphore arm coordinated with the setting mechanism, which may be so positioned as to indicate at all times to an observer for what maximum speed the regulator is set.

It is apparent that the mechanisms of the regulator may be used without recourse to the setting mechanism, my invention contemplating certain minor details of construction and arrangement of parts which pertain more particularly to the regulator mechanism, irrespective of the presence or absence of the setting device.

The invention consists primarily in a speed regulator for automobiles embodying therein the novel features of construction and combination of parts hereinafter set forth and described, and more particularly pointed out in the claims hereto appended.

Referring to the drawings,

Fig. 2 is a side view with the inclosing housing in section;

Fig. 5 is an enlarged detail view of a portion of the constant and variable speed members, showing the arrangement of the signal contacts.

Like letters refer to like parts throughout the several views.

Figure 1:
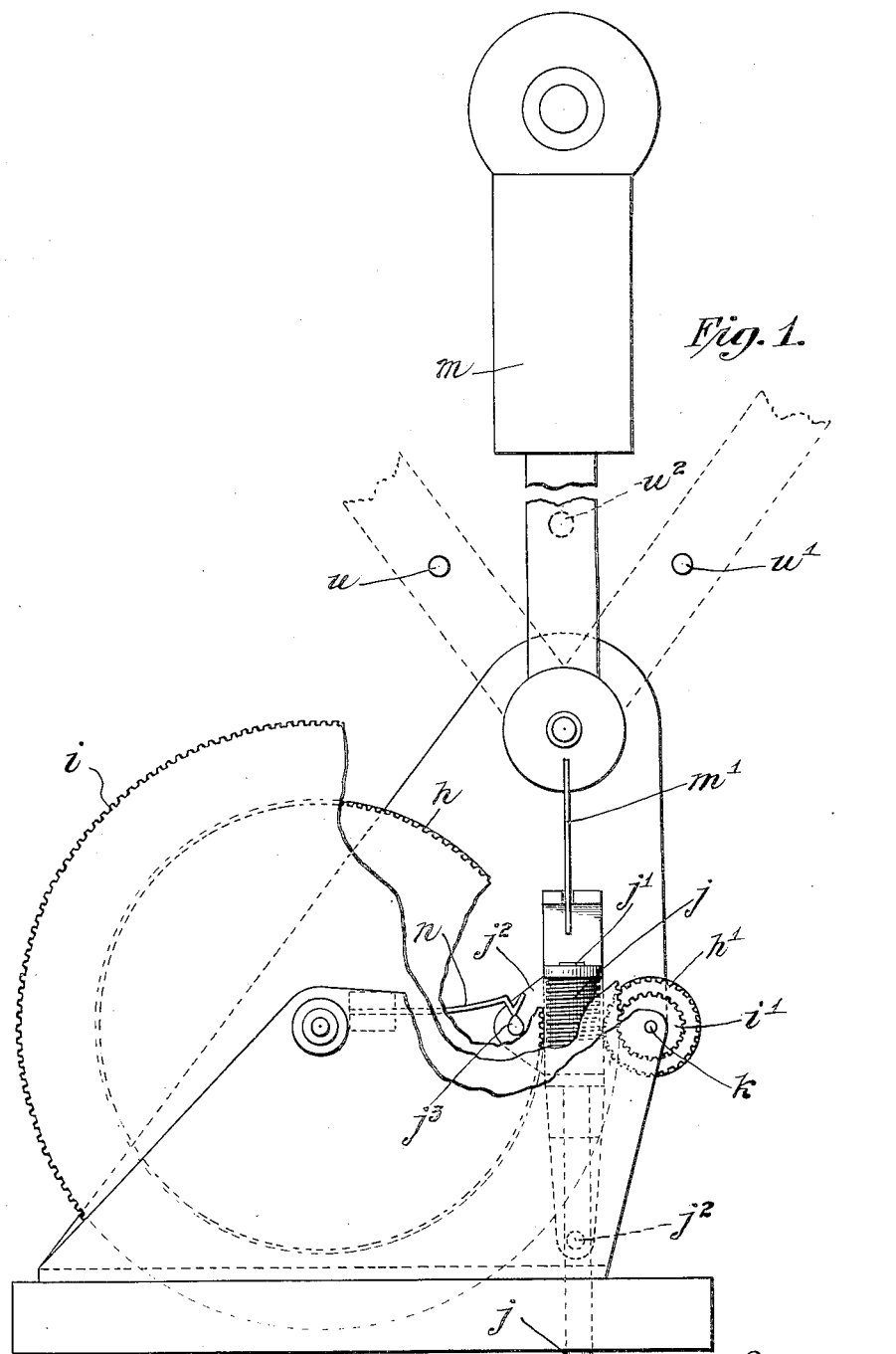
Fig. 1 is a front view of the mechanism for actuating the variable speed member.
Figure 3:
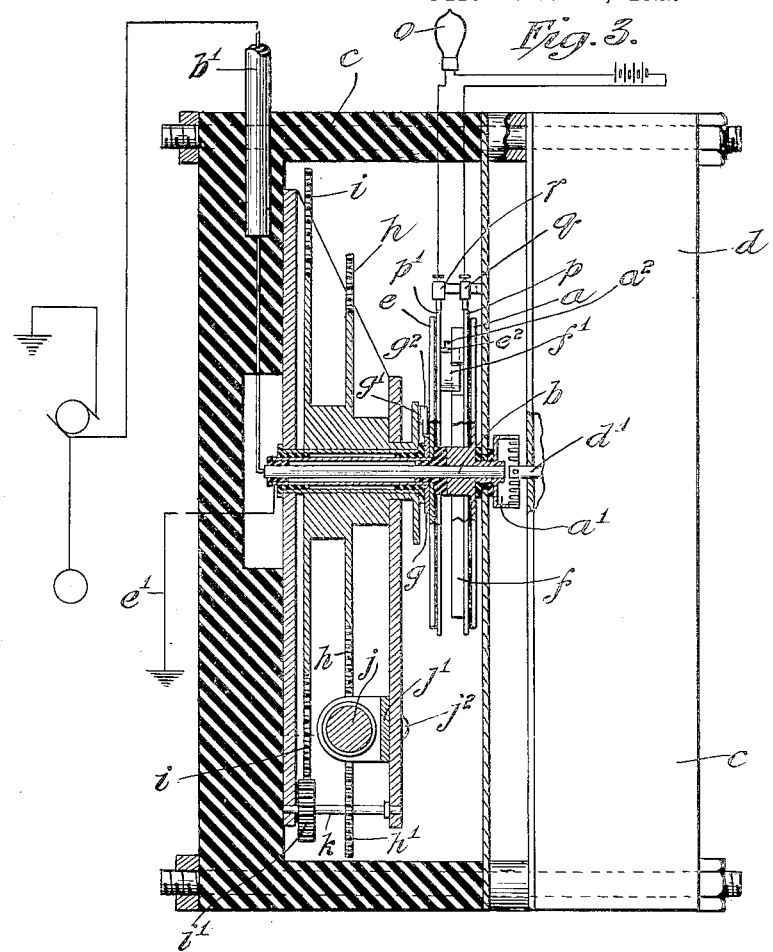
Fig. 3 is a section on the line 3—3 of Fig. 2.
Figure 4:
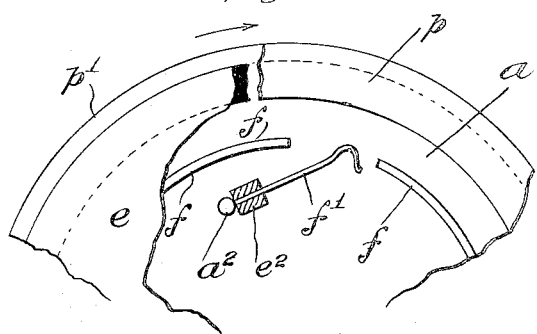
Fig. 4 is an enlarged sectional view on the line 4—4 of Fig. 2.

In the embodiment of my invention shown in the drawings, I employ a constant speed member $a$ mounted upon and electrically connected with a shaft $b$ carried by a suitable housing $c$ of hard rubber or other suitable insulating material so as to prevent the connection of the ignition system across the regulator. The shaft $b$ is in constant electrical connection with a magneto, or other source of electrical supply by the heavily sheathed, insulated wire $b'$ fixedly secured to the casing $c$.

The hub of the member $a$ is provided with a coupling member $a'$ adapted to be connected by the pin $a^2$ with the end of a slow moving shaft $d'$ included in the clockworks $d$, which latter may be of any desired construction so as to give the desired number of revolutions per hour to said member $a$.

Idly mounted upon, but insulated from the shaft $b$, is a variable speed member $e$ adapted to be driven from the driving gear of an automobile by a mechanism to be hereinafter described. In the form of the invention shown, the member $e$ is connected with ground in any desired manner, as by the wire $e'$, this embodiment of the invention being particularly designed for use with a high tension magneto.

The members $a$ and $e$ are adapted to be electrically connected by means of co-operating contacts $f$—$f'$ one of which as $f$ is carried by the member $a$ and is in the form of an interrupted annulus, and the other of which as $f'$ is in the form of a spring arm and carried by the member $e$, the contact $f'$ being normally disengaged from the contact $f$.

In addition to being adapted to be electrically connected with each other, the members $a$—$e$ are provided with co-operating, normally operative means whereby the member $e$ is normally rotated in unison with the member $a$. This means comprising co-operating abutments $a^2$—$e^2$ carried by said members respectively, at least one of which abutments as $a^2$ is of insulating material, or insulated as $a^2$ from the member $(a)$ carrying it.

By this construction, so long as the angular speed of the member $e$ is lower than that of the member $a$, said member $e$ will be rotated by said member $a$, it being essential that the driving means operative upon said member $e$ be so constructed as to permit movement of said last named member independently of said driving means.

Carried by the member $e$ is a ratchet wheel $g$, and mounted upon the shaft $b$ but insulated therefrom, is a member $g'$ carrying a pawl $g^2$ engaging the ratchet wheel $g$, the teeth of said ratchet wheel being so set that said wheel may rotate with relation to said pawl under the control of the abutment $a^2$ and at a speed higher than that of said pawl.

Mounted upon the same hub as the member $g'$ is a worm gear $h$ and a spur gear $i$, power being applied to said member $g^2$ through either of said gears $h$—$i$ so as to permit said member to be driven at different speed ratios with relation to the driving gear of the automobile, as determined by a selectively operative setting mechanism acting upon a worm shaft $j$. Said worm shaft is adapted to be meshed directly with the worm gear $h$, or entrained with the spur gear $i$ through speed reducing gearing consisting of the worm gear $h'$ oppositely disposed as to the gear $h$, and the spur gear $i'$ constantly in mesh with the gear $i$, said gears $h'$—$i'$ being carried by a shaft $k$ counter to the shaft $b$. The worm shaft $j$ is mounted in a movable support or bracket $j'$ and positioned between the gears $h$—$h'$ so that it may be brought into mesh with either gear. The construction is such however, that said worm shaft cannot be brought into a vertical position so as to be disengaged from both said worm gears.

To permit the actuation of the worm $j$ in the manner above described, I mount the bracket or support $j'$ upon the pivot $j^2$ so as to permit the support or bracket to be oscillated to impart the desired movement to said worm. The quantity of movement required is merely that necessary to disengage the threads of the worm $j$ from one of said worm wheels just prior to its engagement with the other, it being desirable to afford as little clearance as possible.

Pivotally mounted in the supporting frame for the shaft $b$ is an actuating arm $m$ in the form of a target or semaphore arm of sufficient length to be visible from a street or roadway, the position of this arm indicating for what maximum speed limit the regulator is set. Various devices may be used to make the arm $m$ conspicuous.

The arm $m$ is connected with the support or bracket $j'$ by means of a flat spring $m'$ secured to said arm and to said bracket so that the initial movement of said arm will tension said spring and cause the movement of the support or bracket to result from the reflex action of the spring, thus preventing the bringing of the arm $j$ into a position where it is disengaged from both worm gears $h$—$h'$. As a further safeguard, I provide the support or bracket $j'$ with an extension $j^2$ carrying a pin $j^3$ having a double bevelled edge, acting upon which is a spring $n$ also having a double bevelled projection so that when the support or bracket $j'$ reaches a position where the worm is disengaged from one of said worm gears and before it is engaged with the other, said spring $n$ will complete the shifting movement of the support or bracket $j'$ and of the arm $m$, even though the latter be released by the driver.

Since it is desirable to apprise an operator when he is exceeding the speed limit, I provide a signalling device consisting of the lamp $o$, or any other desired electro receptive device, visible or audible, arranged in a normally open circuit including therein rings $p$—$p'$ carried by the members $a$ and $e$ respectively, one of which has a projecting resilient tongue $p^2$ projecting within a gap or opening in the other ring, but normally out of engagement with said last named ring.

Said rings are placed in electrical circuit with a suitable source of supply by means of the brushes $q$—$r$.

In the form of the invention shown, I employ a signal lamp $o$, but may, if desired, use an audible signal.

Figure 6:
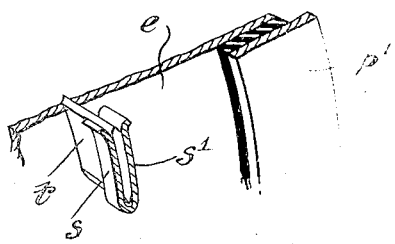
Fig. 6 is a view of a portion of said members showing a modified form of the co-operating contact members and driving abutment for use with a D. C. or a low tension magneto ignition system.

While heretofore I have described a structure particularly adapted for use with a high tension magneto ignition system, I have shown in Fig. 6 an arrangement of electrical and mechanical connections between the members $a$ and $e$ by which the device may be used with a D. C. or a low tension magneto ignition system. In this form of the invention, the member $a$ is provided with looped contact plates $s$—$s'$ while the member $e$ is provided with a knife blade $t$ normally in electrical and mechanical connection with the plates $s$—$s'$. The other mechanisms will be the same as heretofore described, with the exception that the wiring conditions will have to be made to conform to the system used, the wire $b'$ being connected with the source of power and the wire $e'$ being connected with the timer of the ignition system, instead of with ground, as shown.

While the spring $n$ will prevent displacement of the support or bracket $j'$ as a result of vibration, I preferably provide stops operative upon the arm $m$ in its two extreme positions, to hold this arm firmly in position. In the accompanying drawings I have shown said stops as being friction studs $u$—$u'$ adapted to enter a depression or socket $u^2$ in said arm.

The operation of the herein described mechanism is substantially as follows:—

In order to permit the functioning of the ignition system, it is essential that the member $a$ shall be continuously rotated, since movement of the member $e$ at a speed greater than that of the member $a$ will, after a short interval, interrupt the circuit to the ignition system and thus stop the vehicle.

While the vehicle is running, the member $e$ will be rotated at a speed determined by the running gear of the vehicle. So long as the speed of the vehicle is such as to drive said member $e$ at a speed no greater than that of the member $a$, the ignition system will function.

If the speed of the vehicle is such as to have a tendency to rotate the member $e$ at a speed lower than that of the member $a$, said member $e$ will be driven from the member $a$ by the mechanism described.

In the form of the invention shown in Figs. 1 to 5, so long as the member $e$ is driven from the member $a$, the electrical connections between said members will be so positioned as to interrupt the circuit to ground, and in the form shown in Fig. 6, the circuit will be closed, thus permitting the functioning of the ignition system. When the speed of the member $e$ exceeds that of the member $a$ under the control of the running gear of the vehicle, the contacts carried by said members $a$ and $e$ (Figs. 1 to 5) will approach each other, and after a short interval engage, so as to ground the magneto, and thus interrupt the functioning of the ignition system, or when the circuit is normally closed through said members $a$ and $e$, the above conditions will cause the opening of the circuit with the same ultimate result as to the ignition system.

The arrangement of the rings $p$—$p'$ and contact $p^2$ is such that the circuit through said rings will be closed before the contacts carried by the members $a$ and $e$ become operative to interrupt the functioning of the ignition system, thus permitting the driver to bring his vehicle under control before the engine is stopped.

It is apparent that by allowing the member $e$ to exceed the speed of the member $a$ for a short interval before there is any change in the circuit conditions, that a vehicle may be permitted to exceed the speed limit for short distances, although any excess of speed will necessitate a reduction of speed for a corresponding interval, so that no advantage is gained by temporary increases in speed.

It is apparent that if the connection between the member $e$ and the running gear of the automobile is such to impart fairly high speed to said member *e*, the regulator will become operative to stop the engine at a lower speed of the vehicle than would be the result if the connecting mechanism between the member *e* and the running gear were such as to turn this member at a lower speed. As a consequence, if the worm *j* be connected directly with the worm gear *h*, the maximum speed permitted by the regulator will be lower than though said worm be connected with the worm gear *i*, through the speed reducing mechanism consisting of the worm gear *h'* and the gear *i'*. Hence by engaging the worm *j* with one or the other of the worm gears *h—h'*, the maximum speed permitted before the regulator becomes operative to interrupt the functioning of the ignition system may be varied, thus adapting the regulator for use for controlling speed according to different speed requirements.

By using the arm *m* in a visible position, the speed for which the regulator is set may be determined by a person upon the roadway, thus giving an added safeguard against an improper use of the regulator.

It is apparent that a temporary shifting of the worm *j* cannot be resorted to to evade traffic regulations, since if a vehicle is operating within the higher maximum speed, it must be brought to a lower speed before the signal can be changed without resulting in a speedy interruption of the circuit to the ignition system.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A speed regulator for automobiles embodying therein a constant speed member, a variable speed member, mechanical and electrical connections between said members, whereby said variable speed member may be driven by said constant speed member, and the circuit to an ignition system is controlled, a plurality of differentially operative actuating means, connections between said actuating means respectively and said variable speed member, said connections permitting movement of said member independently of said actuating means, and means operatively connected with the running gear of a vehicle and capable of being selectively engaged with said actuating means to cause a change in the speed ratio between said variable speed member and the running gear of a vehicle.

2. A speed regulator for automobiles embodying therein a constant speed member, a variable speed member, mechanical and electrical connections between said members, whereby said variable speed member may be driven by said constant speed member, and the circuit to an ignition system is controlled, a plurality of differentially operative actuating means, connections between said actuating means respectively and said variable speed member, said connections permitting movement of said member independently of said actuating means, means operatively connected with the running gear of a vehicle, an arm adapted to be visibly located, and connections between said arm and said last named means, whereby said means may be selectively engaged with said actuating means to cause a change in the speed ratio between said variable speed member and the running gear of a vehicle.

3. A speed regulator for automobiles embodying therein a constant speed member, a variable speed member, mechanical and electrical connections between said members, whereby said variable speed member may be driven by said constant speed member, and the circuit to an ignition system is controlled, two connected gears, one of which is a worm gear, a gear train including a worm gear adjacent said first named worm gear, and a gear in mesh with the gear connected with said first named worm gear, connections between said connected gears and said variable speed member, said connections permitting movement of said member independently of said gears in one direction, and a worm shaft operatively connected with the running gear of a vehicle and capable of being selectively engaged with said worm gears to cause a change in the speed ratio between said variable speed member and the running gear of a vehicle.

4. A speed regulator for automobiles embodying therein a constant speed member, a variable speed member, mechanical and electrical connections between said members, whereby said variable speed member may be driven by said constant speed member, and the circuit to an ignition system is controlled, two connected gears, one of which is a worm gear, a gear train including a worm gear adjacent said first named worm gear, and a gear in mesh with the gear connected with said first named worm gear, connections between said connected gears and said variable speed member, said connections permitting movement of said member independently of said gears in one direction, a worm shaft operatively connected with the running gear of a vehicle, an arm adapted to be visibly located, and connections between said arm and said worm shaft, whereby said shaft may be selectively engaged with said worm gears to cause a change in the speed ratio between said variable speed member and the running gear of a vehicle.

5. A speed regulator for automobiles embodying therein a constant speed member, a variable speed member, mechanical and electrical connections between said members, whereby said variable speed member may be driven by said constant speed member, and the circuit to an ignition system is controlled, two connected gears, one of which is a worm gear, a gear train including a worm gear adjacent said first named worm gear, and a gear in mesh with the gear connected with said first named worm gear, connections between said connected gears and said variable speed member, said connections permitting movement of said member independently of said gears in one direction, a pivotal bracket, a worm shaft mounted in said bracket and bracket and operatively connected with the running gear of a vehicle, a pivotal arm adapted to be visibly located, and a flexible connection between said arm and said bracket whereby the movement of said arm will apply power to said bracket through said flexible member and permit said worm shaft to be selectively engaged with said worm gears to cause a change in the speed ratio between said variable speed member and the running gear of a vehicle.

6. A speed regulator for automobiles embodying therein a constant speed member, a variable speed member, mechanical and electrical connections between said members, whereby said variable speed member may be driven by said constant speed member, and the circuit to an ignition system is controlled, two connected gears, one of which is a worm gear, a gear train including a worm gear adjacent said first named worm gear, and a gear in mesh with the gear connected with said first named worm gear, connections between said connected gears and said variable speed member, said connections permitting movement of said member independently of said gears in one direction, a pivotal bracket, a worm shaft mounted in said bracket and operatively connected with the running gear of a vehicle, a pivotal arm adapted to be visibly located, a flexible connection between said arm and said bracket whereby the movement of said arm will apply power to said bracket through said flexible member and permit said worm shaft to be selectively engaged with said worm gears to cause a change in the speed ratio between said variable speed member and the running gear of a vehicle, and means independent of said arm whereby said worm shaft is caused to engage one of said worm gears or the other.

7. A speed regulator for automobiles embodying therein a constant speed member, a variable speed member, mechanical and electrical connections between said members, whereby said variable speed member may be driven by said constant speed member, and the circuit to an ignition system is controlled, two connected gears, one of which is a worm gear, a gear train including a worm gear adjacent said first named worm gear, and a gear in mesh with the gear connected with said first named worm gear, connections between said connected gears and said variable speed member, said connections permitting movement of said member independently of said gears in one direction, a pivotal bracket, a worm shaft mounted in said bracket and operatively connected with the running gear of a vehicle, a pivotal arm adapted to be visibly located, a flexible connection between said arm and said bracket whereby the movement of said arm will apply power to said bracket through said flexible member and permit said worm shaft to be selectively engaged with said worm gears to cause a change in the speed ratio between said variable speed member and the running gear of a vehicle, a member carried by said bracket, the opposite edges of which are bevelled and reduced to an edge, and a spring having oppositely bevelled projections adapted to co-operate with said member, whereby said bracket will be actuated to engage said worm shaft with one of said worm gears or the other.

8. A speed regulator for automobiles embodying therein a constant speed member, a variable speed member, mechanical and electrical connections between said members, whereby said variable speed member may be driven by said constant speed member, and the circuit to an ignition system is controlled, two connected gears, one of which is a worm gear, a gear train including a worm gear adjacent said first named worm gear, and a gear in mesh with the gear connected with said first named worm gear, connections between said connected gears and said variable speed member, said connections permitting movement of said member independently of said gears in one direction, a worm shaft operatively connected with the running gear of a vehicle and capable of being selectively engaged with said worm gears to cause a change in the speed ratio between said variable speed member and the running gear of a vehicle, and means independent of said arm whereby said worm shaft is caused to engage one of said worm gears or the other.

9. A speed regulator for automobiles embodying therein a rotatable member, means whereby said member is constantly driven at uniform speed, a variable speed rotatable member, an elongated contact member having a gap therein carried by said constant speed member, a yieldable contact member carried by said variable speed member, said contacts being included in the ground connection of a high tension magneto, co-operating non-conducting abutments carried by said members, whereby under normal conditions said variable speed member will be actuated in unison with said constant speed member, and said spring contact will be positioned within the gap of said elongated contact member, actuating means for said variable speed member adapted to be operatively connected with the running gear of a vehicle, and connections between said actuating means and said variable speed member permitting movement of said member under the control of said constant speed member and independently of said actuating means.

10. A speed regulator for automobiles embodying therein a rotatable member, means whereby said member is constantly driven at uniform speed, a variable speed rotatable member, an elongated contact member having a gap therein carried by said constant speed member, a yieldable contact member carried by said variable speed member, said contacts being included in the ground connection of a high tension magneto, co-operating non-conducting abutments carried by said members, whereby under normal conditions said variable speed member will be actuated in unison with said constant speed member, and said spring contact will be positioned within the gap of said elongated contact member, actuating means for said variable speed member adapted to be operatively connected with the running gear of a vehicle, connections between said actuating means and said variable speed member permitting movement of said member under the control of said constant speed member and independently of said actuating means, and conductor rings carried by said members respectively, normally disengaged electrical contacts carried by said rings, an electrically actuated signal, and means whereby said rings and said signal may be included in an electrical circuit, said contacts, when said members are moving in unison, being spaced apart, and being engaged before said first named electrical contacts become operative to interrupt the circuit to the ignition system.

In witness whereof I have hereunto affixed my signature, in the presence of two subscribing witnesses, this 3rd day of March, 1922.

FREDERICK W. TEVES.

Witnesses:
FRIEDA KOEHLER,
SOPHIE M. BAEDER.